United States Patent [19]
Barnes

[11] 4,077,150
[45] Mar. 7, 1978

[54] FISHING ROD HANDLE ASSEMBLY

[75] Inventor: Richard D. Barnes, Costa Mesa, Calif.

[73] Assignee: The Garcia Corporation, Teaneck, N.J.

[21] Appl. No.: 658,040

[22] Filed: Feb. 13, 1976

[51] Int. Cl.² ............................................. A01K 87/00
[52] U.S. Cl. ............................................ 43/23; 43/22
[58] Field of Search ...................................... 43/23, 22

[56] References Cited

U.S. PATENT DOCUMENTS

| | | | |
|---|---|---|---|
| 1,641,226 | 9/1927 | Kinnear | 43/23 |
| 1,898,323 | 2/1933 | Teetor | 43/23 |
| 2,104,495 | 1/1938 | O'Brien, Jr. | 43/22 |
| 2,514,950 | 7/1950 | Harrington | 43/23 |
| 2,756,531 | 7/1956 | Hollenshead | 43/23 X |

FOREIGN PATENT DOCUMENTS 744,912   10/1966   Canada ..................................... 43/22

*Primary Examiner*—Russell R. Kinsey
*Assistant Examiner*—Daniel J. Leach
*Attorney, Agent, or Firm*—Fitzpatrick, Cella, Harper & Scinto

[57] ABSTRACT

A fishing rod handle assembly has a forward portion for engaging one end of a rod blank, an intermediate reel seat portion to which a reel is to be fastened and a rearward portion including a butt grip. The forward and reel seat portions are positioned along a common longitudinal axis which extends through the rod blank while the butt grip is offset therefrom.

9 Claims, 2 Drawing Figures

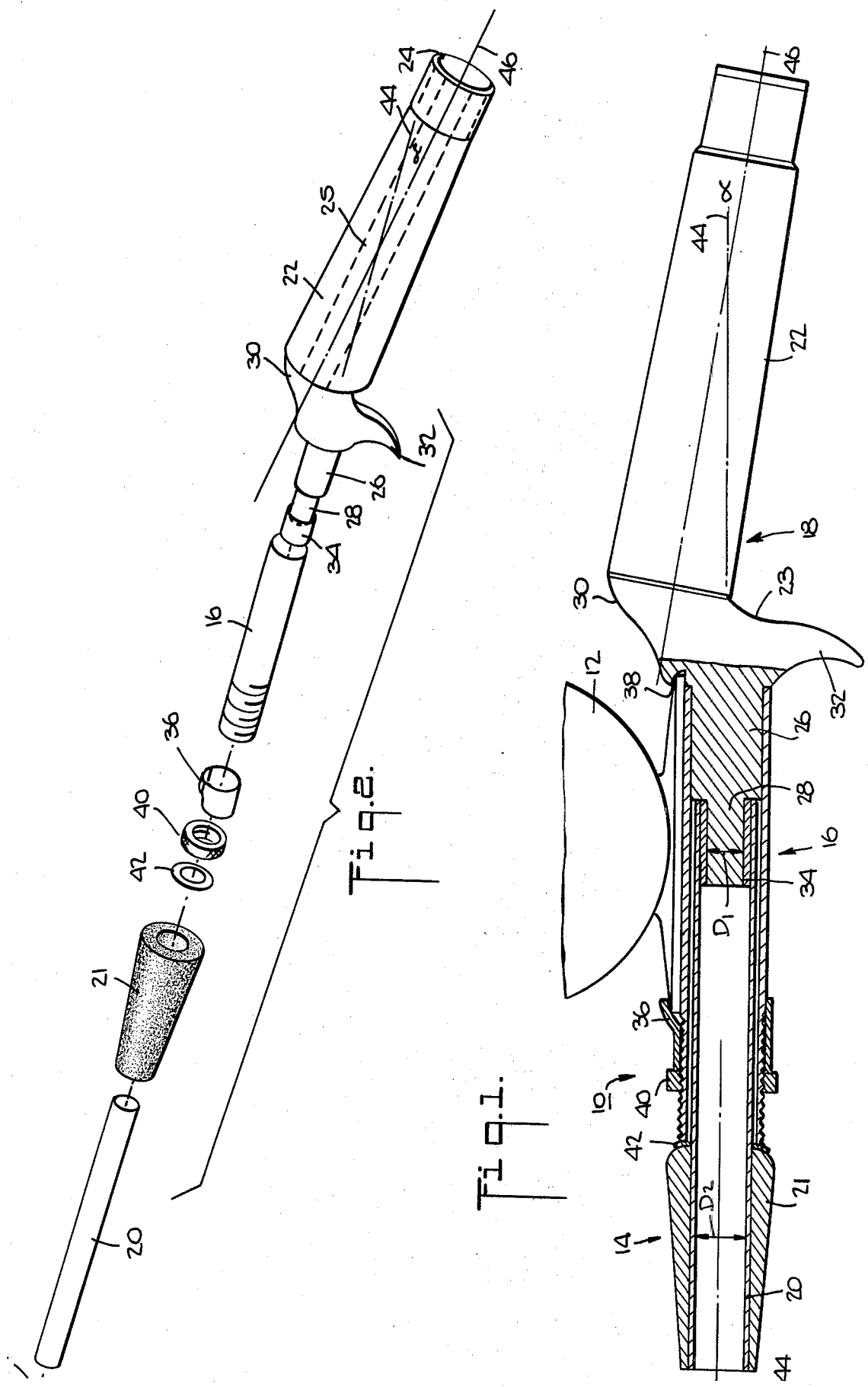

FISHING ROD HANDLE ASSEMBLY

BACKGROUND OF THE INVENTION

1. Field of the Invention

This invention relates to fishing rods and more particularly it concerns a novel fishing rod handle assembly.

2. Description of the Prior Art

Two types of fishing rod handle assemblies are generally known in the art. In one construction, the fishing rod blank and its associated handle assembly extend along a common longitudinal axis. However in this type of arrangement, a reel positioned on the handle assembly is spaced a considerable distance from the common longitudinal axis and thus from the hand grip portion. Accordingly, thumb control of reel spin for both spinning and casting reels is awkward. Also, when a heavy casting reel is used, its center of gravity is spaced above the handle assembly to an extent which adversely affects the overall feel of the rod.

In a second known construction, the handle assembly is designed so that a reel positioned thereon is closer to the hand grip portion which in turn makes it easier to control reel spin. U.S. Pat. Nos., 2,483,519 and 2,504,631 are illustrative of a design wherein both the forward portion and the rearward or grip portions are positioned along a common longitudinal axis which extends through the center of the rod blank while the reel seat portion is offset therefrom. U.S. Pat. Nos. 2,593,747 and 2,756,531 are illustrative of a design where the forward portion of the handle assembly is positioned along a longitudinal axis which passes through the center of the rod blank while the reel seat is offset from this longitudinal axis and the rearward hand grip portion extends at an acute angle from a point common with the rod's longitudinal axis. In both of these designs, the spin of a reel positioned on the handle assembly can be controlled and these designs provide a more comfortable feel. However, these handle assemblies produce a new problem which results from positioning a reel on a reel seat which does not have a common longitudinal axis with the rod blank. When casting, the rod tends to bow and since the finishing line passes through line guides positioned along the surface of the rod blank, the line follows the contour of the rod. Thus, when a reel is positioned on an offset axis, the line, as it is stripped off the reel understandably tends to rub along the rod surface near the point of joinder of the rod blank and the handle assembly. This rubbing may cause extreme wear and, eventually, failure of the line.

SUMMARY OF THE INVENTION

The present invention avoids the disadvantages of the prior art by means of a novel rod handle assembly which is contoured to accommodate a reel so that it is near the grip portion of the handle assembly to facilitate thumb control while at the same time being sufficiently spaced from the rod itself to prevent the line from rubbing along the rod surface during casting, as well as retrieval.

Accordingly, there is provided a novel fishing rod handle assembly comprising a forward portion dimensioned to engage the rearward end of a fishing rod blank, a reel seat portion including retainer means for fastening a reel to the seat portion and a rearward portion having a butt grip. The reel seat and forward portions are positioned along a common longitudinal axis while the longitudinal axis of the butt grip is offset with respect to this common axis.

It will be appreciated that by providing the reel seat on a common axis with the forward position, the reel will be positioned high enough above the rod to prevent the line from rubbing against the rod surface when it bows. At the same time, by offsetting the butt grip, the reel is positioned for easy thumb control of reel spin during casting.

There has thus been outlined the more important features of the invention in order that the detailed description thereof that follows may be better understood and in order that the present contribution to the art may be better appreciated. There are, of course, additional features of the invention that will be described hereinafter and which will form the subject of the claims appended hereto. Those skilled in the art will appreciate that this invention may be utilized as the basis for designing other structures for carrying out the several purposes of this invention. It is therefore important that the claims be regarded as including such equivalent constructions as do not depart from the spirit and scope of the invention.

BRIEF DESCRIPTION OF THE DRAWINGS

One embodiment of the invention has been chosen for purposes of illustration and description, and is shown in the accompanying drawings forming a part of the specification, wherein:

FIG. 1 is a side elevation, partially cut away, of a fishing rod handle assembly embodying the present invention; and FIG. 2 is an exploded, perspective view of the handle assembly of FIG. 1.

DETAILED DESCRIPTION OF THE PREFERRED EMBODIMENT

In FIGS. 1 and 2 there is shown a handle assembly 10 according to the present invention to which a fishing reel 12 is fastened. It will be appreciated that the particular type of reel 12 used with the handle assembly 10 forms no part of the invention and that the handle assembly may therefore be used either with a casting reel or with a top mounted spinning reel.

The components of the handle assembly are preferably constructed from a light-weight material such as plastic or aluminum and basically include a forward portion, generally indicated at 14, a hollow, intermediate, reel seat portion 16 and a rearward grip portion generally indicated at 18. The forward portion 14, and rearward portion 18, extend into the opposite ends of the hollow reel seat portion 16 and are dimensioned to engage one another when so positioned in order to provide a solid interconnection between the various portions of the handle assembly 10.

Forward portion 14 includes an elongated, hollow bushing 20 having a raised slip-resistant foregrip 21 at one end. The bushing 20 is dimensioned to extend through the hollow reel seat portion 16 while the opposite or distal end is adapted to retain an end of a fishing rod blank (not shown) therein.

The rearward grip portion includes a slip-resistant butt grip 22, similar to foregrip 21, a support assembly 23 and an end cap 24. The support assembly includes a post 25 (shown in phantom in FIG. 2), a cylindrical extension 26 with a reduced diameter end 28 and an intermediate section 30. As shown, the intermediate section 30 comprises a step from the longitudinal axis of the rod and reel seat to the longitudinal axis of the butt grip 22. It is presently preferred to manufacture the intermediate section 30 and extensions 26, 28 as a unitary member of cast or machined metal such as aluminum. Moreover, for structural integrating, it is also preferred to make the post 25 as a unitary rearward extension of the intermediate section 30, on which the butt grip 22 is mounted. Intermediate section 30 may further include a finger grip 32 to facilitate casting.

By using bushings 20 of various inner diameters, the instant handle assembly 10 may be used with a variety of fishing rod blanks. In this regard, when a rod blank has an outer diameter equal to the outer diameter $D_1$ of the reduced diameter end 28, a bushing 20 with an inner diameter $D_2$ slightly larger than diameter $D_1$, to permit a snug fit between the rod and the reduced diameter end 28, is used. For rods with larger diameters, the bushing diameter $D_2$ is increased, thereby reducing the thickness of the bushing and a sleeve 34 is positioned between the bushing 20 and reduced diameter end 28. This construction is, of course, only a variant of the present invention which permits use of a common handle assembly with various rod blank sizes. It is therefore, important to note that the sleeve 32 may be dispensed with when the reduced diameter end 28 corresponds in outer diameter to the inner diameter of the bushing 20. Thus, the handle assembly of this invention may be constructed with various sized reduced diameter ends 28 whereby the need for a sleeve 34 is eliminated.

To secure a reel 12 on the reel seat portion, a reel foot retainer 36 is slidably positioned around the reel seat portion 16 and a notch 38 is formed in the intermediate section 30. The forward end of the reel seat portion is threaded to accept a nut 40 for locking retainer 36 against one foot of reel 12 after the other foot has been position within notch 38. A spacer 42 may be positioned between the foregrip 21 and the reel seat portion 16 to protect the foregrip from the adjacent threads on portion 16.

As clearly shown in FIG. 1, the forward portion 14 and the intermediate reel seat portion 16 extend along a common longitudinal axis 44 which passes through the center of the rod blank (not shown). As a result, line which runs from the reel 12 along the rod is sufficiently spaced therefrom to prevent rubbing when the rod bows. At the same time, the longitudinal axis 46 of the butt grip 22 is offset with respect to axis 44 to facilitate thumb control of reel spin. While the longitudinal axis 46 of the butt grip may be parallel to that of axis 44, it has been found that an angular offset $\alpha$, ranging from 6° to 8° provides a particularly comfortable feel.

It will therefor be appreciated that the present reel holder assembly facilitates thumb control of reel spin while at the same time overcoming the problems which result when the reel seat is offset with respect to the longitudinal axis of the rod. Moreover, the present invention makes possible a significant reduction of handle weight in various applications such as in a casting rod. By utilizing light weight materials including aluminum and plastic which is made practical by the invention, a weight savings of up to 50% is attainable without sacrificing integrity. This is particularly important in ultra-light casting rods.

What is claimed is:

1. A fishing rod handle assembly comprising a forward portion dimensioned to engage one end of a fishing rod blank, an intermediate reel seat portion including retainer means for fastening a fishing reel thereto and a rearward portion including a butt grip, wherein said reel seat and forward portions have a common longitudinal axis, and wherein the longitudinal axis of said butt grip is offset from said common longitudinal axis in a direction such that said butt grip facilitates thumb control of reel spin during casting.

2. A fishing rod handle assembly according to claim 1, wherein the longitudinal axis of said butt grip is angularly offset from said common longitudinal axis.

3. A fishing rod handle assembly according to claim 1, wherein the opposed ends of said reel seat portion are dimensioned to receive a part of said forward and rearward portions therein.

4. A fishing rod handle assembly according claim 2, wherein said rearward portion further includes an elongated post on which said butt grip is mounted, an extension offset from the longitudinal axis of said post and fitted within one end of said reel seat portion and an intermediate connecting segment, said post extension and connecting segment having a unitary construction.

5. A fishing rod handle assembly according to claim 4, wherein said connecting segment further includes a finger grip.

6. A fishing rod handle assembly according to claim 3, wherein said forward portion includes a hollow bushing, one end of which is fitted within one end of said reel seat portion, the other end of said bushing being dimensioned to receive one end of a fishing rod blank therein.

7. A fishing rod handle assembly comprising a forward portion dimensioned to engage one end of a fishing rod blank, an intermediate reel seat portion including retainer means for fastening a fishing reel thereto and a rearward portion including a butt grip, said reel seat and forward portions having a common longitudinal axis while the longitudinal axis of said butt grip is offset from said common longitudinal axis in a direction such that said butt grip facilitates thumb control of reel spin during casting, wherein said reel seat portion is an elongated hollow member, said forward portion including a hollow bushing one end of which is fitted within one end of said hollow reel seat, the other end of said bushing being dimensioned to receive one end of a rod blank therein; wherein said rearward portion includes an extension offset from the axis of said butt grip and fitted within the other end of said hollow reel seat and wherein said extension includes means to fit said extension within said one end of said bushing.

8. A fishing rod handle assembly according to claim 7, wherein said fitting means includes a reduced diameter end portion on said extension.

9. A fishing rod handle assembly according to claim 8, wherein said fitting means further includes a sleeve positioned on said reduced diameter end portion.

* * * * *

UNITED STATES PATENT AND TRADEMARK OFFICE
CERTIFICATE OF CORRECTION

PATENT NO. : 4,077,150
DATED : March 7, 1978
INVENTOR(S) : Richard D. Barnes

It is certified that error appears in the above-identified patent and that said Letters Patent are hereby corrected as shown below:

Col. 1, line 44, "finishing" should be --fishing--.

Col. 3, line 24, "32" should be --34--.

Signed and Sealed this

Twenty-second Day of August 1978

[SEAL]

Attest:

RUTH C. MASON
Attesting Officer

DONALD W. BANNER
Commissioner of Patents and Trademarks